(12) United States Patent
Kaneuchi et al.

(10) Patent No.: US 8,652,596 B2
(45) Date of Patent: Feb. 18, 2014

(54) IN-MOLD MOLDED PRODUCT, IN-MOLD MOLDING FILM, AND METHOD FOR PRODUCING IN-MOLD MOLDED PRODUCT

(75) Inventors: Kazuhiko Kaneuchi, Osaka (JP); Gakuei Shibata, Osaka (JP)

(73) Assignee: Panasonic Corporation, Osaka (JP)

( * ) Notice: Subject to any disclaimer, the term of this patent is extended or adjusted under 35 U.S.C. 154(b) by 77 days.

(21) Appl. No.: 13/418,618

(22) Filed: Mar. 13, 2012

(65) Prior Publication Data

US 2012/0237702 A1 Sep. 20, 2012

(30) Foreign Application Priority Data

Mar. 16, 2011 (JP) ................................. 2011-057327
Jan. 6, 2012 (JP) ................................. 2012-000851

(51) Int. Cl.
*B41M 5/40* (2006.01)

(52) U.S. Cl.
USPC ................... 428/32.52; 428/32.69; 428/32.79

(58) Field of Classification Search
USPC ................. 428/32.52, 32.69, 32.79
See application file for complete search history.

(56) References Cited

U.S. PATENT DOCUMENTS 7,364,612 B2   4/2008   Sugihara

FOREIGN PATENT DOCUMENTS

JP   4052647 B2   2/2008

*Primary Examiner* — Bruce H Hess
(74) *Attorney, Agent, or Firm* — Hamre, Schumann, Mueller & Larson, P.C.

(57) ABSTRACT

An in-mold molded product of the present invention includes: molded resin; a transfer film sequentially including an adhesive layer in contact with the molded resin, and a coloring layer formed of ink; and a plurality of inorganic filler pieces contained in the coloring layer.

6 Claims, 11 Drawing Sheets

F I G. 1
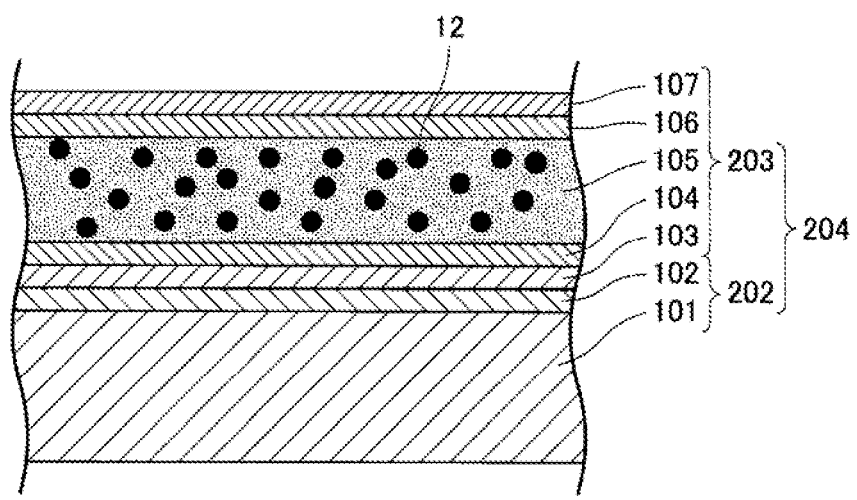

F I G. 4
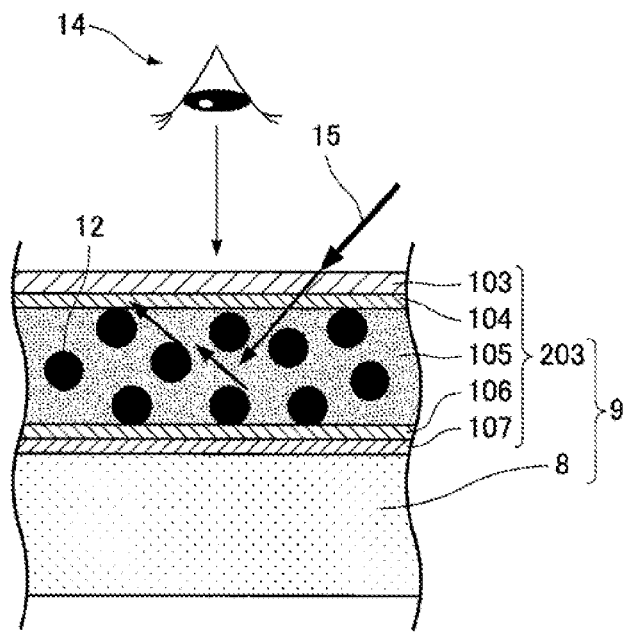

F I G. 1 3    PRIOR ART

IN-MOLD MOLDED PRODUCT, IN-MOLD MOLDING FILM, AND METHOD FOR PRODUCING IN-MOLD MOLDED PRODUCT

The disclosure of Japanese Patent Application No. 2011-057327 filed Mar. 16, 2011 including specification, drawings and claims and the disclosure of Japanese Patent Application No. 2012-000851 filed Jan. 6, 2012 including specification, drawings and claims are incorporated herein by reference in their entirety.

FIELD OF THE INVENTION

The present invention relates to an in-mold molded product including a surface and a transfer film on the surface, an in-mold molding film, and a method for producing an in-mold molded product.

BACKGROUND OF THE INVENTION

FIG. 13 shows a layer configuration of a conventional in-mold molding film. The in-mold molding film is a continuous film, and mainly includes a carrier film 202 that is not transferred to a molded product, and a transfer film 203 that is transferred to the molded product. An in-mold molding film shown in FIG. 13 includes a coloring layer 105 that expresses predetermined design such as color, picture or pattern, and is used for decorating a surface of the molded product. Such an in-mold molding film used for decorating a surface of a molded product with predetermined design is referred to as a decorative film.

In-mold molding is a method for integrally molding a transfer film and injection molding resin in a mold to produce a molded product including a surface and a transfer film on the surface, and for example, used for decorating a surface of the molded product with various pictures. Specifically, in the in-mold molding, the transfer film is conveyed into the mold by a carrier film and mounted to the mold, and then molten injection molding resin is injected toward the transfer film in the mold.

The in-mold molding is used for producing audio-visual equipment such as television sets or audio devices, cellular phones, or the like.

In some decorative films, two-part curable ink having high heat resistance and high coating hardness is used as ink forming a coloring layer in order to prevent failure during injection molding such as ink flow or ink flying due to heat from molten injection molding resin or injection pressure of the molten injection molding resin. For example, see Japanese Patent No. 4052647. The two-part curable ink is prepared by adding a curing agent to thermoplastic resin.

A decorative film 201 shown in FIG. 13 will be further described in detail. A carrier film 202 includes a base film 101 that continuously supplies a decorative film 201 (transfer film 203) into a mold, and a delamination layer 102 for delaminating the transfer film 203 from the base film 101. As the base film 101, a PET film, an acrylic film, or the like is used. The transfer film 203 that is transferred to the surface of a molded product includes a protective layer or hard coat layer 103, an anchor layer 104, a coloring layer 105, a mask layer 106, and an adhesive layer 107. The protective layer or hard coat layer 103 protects the transfer film 203 from flaw or dust on an outermost surface of an in-mold molded product. The anchor layer 104 connects the protective layer or hard coat layer 103 and the coloring layer 105. The coloring layer 105 provides design such as color, picture, or pattern on the surface of the molded product. The mask layer 106 highlights the color of the coloring layer 105. The adhesive layer 107 bonds the transfer film 203 to injection molding resin. As described above, the decorative film 201 includes a plurality of layers.

Next, with reference to FIG. 14, a process for producing an in-mold molded product will be described. FIG. 14 shows a process for producing an in-mold molded product having a surface decorated with a decorative film.

First, in step S1, the decorative film 201 is fed by a foil feeding device 3 so that predetermined design such as color, picture, or pattern expressed by a coloring layer is placed in a predetermined position between a stationary mold 1 and a movable mold 2. At this time, the decorative film 201 is fed so that the base film 101 faces the movable mold 2, and the adhesive layer 107 faces the stationary mold 1.

After the decorative film 201 is placed between the stationary mold 1 and the movable mold 2, in step S2, the decorative film 201 is sucked through a suction hole 4 opened in a cavity surface of the movable mold 2 to mount the decorative film 201 to the cavity surface of the movable mold 2. Thus, the cavity surface is shaped by the decorative film 201. In step S2, an annular foil retaining member 5 secures the decorative film 201 to position the decorative film 201.

Then, in step S3, the movable mold 2 is moved to clamp the stationary mold 1 and the movable mold 2. At this time, the foil retaining member 5 is housed in a housing recess 6 formed in the stationary mold 1.

Next, in step S4, molten injection molding resin 8 is injected from a gate 7 of the stationary mold 1 toward the adhesive layer of the decorative film 201, and thus the molten injection molding resin 8 is poured into a cavity formed by clamping the stationary mold 1 and the movable mold 2. Thus, the molten injection molding resin 8 fills the cavity.

After filling of the molten injection molding resin 8 is completed, in step S5, the molten injection molding resin 8 is cooled to a predetermined temperature and hardened.

Then, in step S6, the movable mold 2 is moved to open the stationary mold 1 and the movable mold 2. At this time, the transfer film 203 adhering to the surface of the hardened (molded) injection molding resin 8 is delaminated from the carrier film 202. Thus, an in-mold molded product 9 having a surface to which only the transfer film 203 is transferred can be obtained. The obtained in-mold molded product 9 is coated with the protective layer or hard coat layer of the transfer film 203.

Then, in step S7, an ejection pin 10 is pushed out through the stationary mold 1 to take out the in-mold molded product 9.

After taking-out of the in-mold molded product 9 is completed, in step S8, adhesion of the decorative film 201 (carrier film 202) to the cavity surface by suction through the suction hole 4 in the movable mold 2 is stopped in preparation for next molding, and then the foil feeding device 3 feeds the decorative film 201. Thus, predetermined design such as color, picture, or pattern formed on the coloring layer and used for the next molding is placed in a predetermined position between the stationary mold 1 and the movable mold 2.

The operations described above are repeated to continuously produce the in-mold molded products 9.

DISCLOSURE OF THE INVENTION

As described above, in order to prevent failure during injection molding such as ink flow or ink flying, using two-part curable ink having high heat resistance and high coating hardness as ink forming a coloring layer of a decorative film has been proposed.

However, when a molded product is a deep-drawing form, if curable ink such as two-part curable ink or heat-curable ink, which has lower elasticity than thermoplastic ink, is used, a microcrack generated in the coloring layer 105 may extend to a crack that can be visually recognized, and further extend to a serious crack extending through the coloring layer 105 during production of the in-mold molded product. The microcrack is an ultrafine crack that cannot be visually recognized. The step having a particularly high possibility of generation and growth of a microcrack is step S4 in which the molten injection molding resin 8 fills the cavity. However, generation and growth of a microcrack may occur in various scenes in the process for producing the in-mold molded product. Also, a part having a particularly high possibility of generation and growth of a microcrack corresponds to a corner of the molded product. A part where generation and growth of a microcrack occurs is not limited to the part corresponding to the corner of the molded product.

FIG. 15 is a sectional view (left figure) of step S4 shown in FIG. 14, and an enlarged sectional view (right upper figure) of a part A in the sectional view (left figure). The part A corresponds to a corner of a molded product. FIG. 15 is a further enlarged sectional view (right lower figure) of a part B in the enlarged sectional view of the part A. Specifically, the enlarged sectional view (right lower figure) of the part B shows the part corresponding to the corner of the molded product in a further enlarged manner.

In step S4 shown in FIG. 15, when the molten injection molding resin 8 fills the cavity of the mold, injection pressure of the injection molding resin 8 is applied to the decorative film 201, and tensile stress thereby is generated in the decorative film 201. Since the injection pressure of the injection molding resin 8 is highest in the part corresponding to the corner of the molded product, tensile stress due to the injection pressure of the injection molding resin 8 is also focused most on the part corresponding to the corner of the molded product. In the enlarged sectional view (right upper figure) of the part A in FIG. 15, stress applied from the injection molding resin 8 to the decorative film 201 in the part corresponding to the corner of the molded product is shown by arrow 301, and tensile stress generated in the coloring layer 105 in the part corresponding to the corner of the molded product is shown by arrow 302. When a molded product is a deep-drawing form, even if the decorative film 201 is sucked through the suction hole 4 opened in the cavity surface of the movable mold 2, the decorative film 201 does not tightly adhere to the cavity surface of the movable mold 2 in the part corresponding to the corner of the molded product, and in the part, there is a gap between the cavity surface of the movable mold 2 and the decorative film 201. Thus, high injection pressure 301 is applied from the injection molding resin 8 to the decorative film 201 in the part corresponding to the corner of the molded product. Further, high tensile stress 302 due to the injection pressure 301 of the injection molding resin 8 is generated in the decorative film 201, and also there is the gap between the cavity surface of the movable mold 2 and the decorative film 201 in the part corresponding to the corner of the molded product. Thus, when a molded product is a deep-drawing form, the decorative film 201 significantly stretches in the part corresponding to the corner of the molded product during injection of the molten injection molding resin 8. Thus, a heavy load is applied to the decorative film 201 in the part corresponding to the corner of the molded product. Also, the decorative film 201 is thinnest in the part corresponding to the corner of the molded product.

As described above, when a molded product is a deep-drawing form, a heavy load is applied to the decorative film 201 in the part corresponding to the corner of the molded product during injection of the injection molding resin 8. Thus, if curable ink such as two-part curable ink or heat-curable ink, which has lower elasticity than thermoplastic ink, is used, ink forming the coloring layer 105 cannot bear the heavy load applied to the decorative film 201 in the part corresponding to the corner of the molded product, and as shown in the enlarged sectional view (right upper figure) of the part A in FIG. 15, a crack 11 that can be visually recognized is generated in the coloring layer 105. The crack 11 is generated by extension (growth) of a microcrack generated in the coloring layer 105. Since the decorative film 201 is thinnest in the part corresponding to the corner of the molded product, as shown in the enlarged sectional view (right lower figure) of the part B in FIG. 15, the crack 11 tends to extend (grow) from the coloring layer 105 to other layers. As a result, the in-mold molded product 9 is a product with a poor appearance such that a base inside the coloring layer 105 is visually recognized through the crack 11. The base is a surface of the hardened (molded) injection molding resin 8.

As described above, when a molded product is a deep-drawing form, if curable ink such as two-part curable ink or heat-curable ink is used, a serious crack 11 is generated in the corner of the molded product to cause a poor appearance such that the base inside the coloring layer 105 can be visually recognized through the crack 11. In order to prevent the poor appearance, curable ink such as two-part curable ink or heat-curable ink may be used only for a shallow draw molded product, and not used when a molded product is a deep-drawing form. Alternatively, thermoplastic ink that is softened and easily stretched by heat of the molten injection molding resin may be used only for the corner of the molded product.

In the case of using thermoplastic ink only for the corner of the molded product, steps for forming the coloring layer are increased in complexity and number, thereby increasing cost or reducing yield.

The present invention has an object to provide an in-mold molded product that prevents a poor appearance such that a base (surface of molded injection molding resin) inside a transfer film is visually recognized through a crack even when a molded product is a deep-drawing form.

The present invention has another object to provide an in-mold molding film that prevents the growth of a microcrack generated in a coloring layer of a transfer film during injection molding even when a molded product is a deep-drawing form.

The present invention has a further object to provide a method for producing an in-mold molded product that prevents the growth of a microcrack generated in a coloring layer of a transfer film during injection molding even when a molded product is a deep-drawing form.

As one aspect of the present invention, an in-mold molded product includes: molded resin; a transfer film sequentially including an adhesive layer in contact with the molded resin, and a coloring layer formed of ink; and a plurality of inorganic filler pieces contained in the coloring layer.

As another aspect of the in-mold molded product of the present invention, a microcrack is generated between the inorganic filler pieces in the coloring layer.

As a further aspect of the in-mold molded product of the present invention, the microcrack is generated from an interface between the inorganic filler piece and the ink forming the coloring layer.

As a further aspect of the in-mold molded product of the present invention, an average particle size of the plurality of inorganic filler pieces is equal to or smaller than a thickness of a thinnest part of the coloring layer.

As a further aspect of the in-mold molded product of the present invention, the ink forming the coloring layer is curable ink.

As a further aspect of the in-mold molded product of the present invention, the inorganic filler piece has a scale shape, a flat plate shape, or a rod shape.

As a further aspect of the in-mold molded product of the present invention, a surface of the coloring layer on a side of the adhesive layer has irregularities, and a surface of the adhesive layer on a side of the molded resin has irregularities.

As one aspect of the present invention, an in-mold molding film includes: a carrier film; a transfer film sequentially including a coloring layer formed of ink and an adhesive layer, and formed on the carrier film; and a plurality of inorganic filler pieces contained in the coloring layer.

As another aspect of the in-mold molding film of the present invention, an average particle size of the plurality of inorganic filler pieces is equal to or smaller than a thickness of a thinnest part of the coloring layer.

As a further aspect of the in-mold molding film of the present invention, the ink forming the coloring layer is curable ink.

As a further aspect of the in-mold molding film of the present invention, the inorganic filler piece has a scale shape, a flat plate shape, or a rod shape.

As a further aspect of the in-mold molding film of the present invention, a surface of the coloring layer on a side of the adhesive layer has irregularities, and a surface of the adhesive layer on a side opposite to the coloring layer has irregularities.

As a further aspect of the in-mold molding film of the present invention, the transfer film sequentially includes a protective layer or hard coat layer, an anchor layer, the coloring layer, a mask layer, and the adhesive layer, and the carrier film sequentially includes a base film, and a delamination layer.

As one aspect of the present invention, a method for producing an in-mold molded product includes the steps of: placing an in-mold molding film including a carrier film, a transfer film sequentially including a coloring layer formed of ink and an adhesive layer, and formed on the carrier film, and a plurality of inorganic filler pieces contained in the coloring layer, between a first mold and a second mold; clamping the first mold and the second mold; pouring resin into a cavity formed by clamping the first mold and the second mold; cooling the resin poured into the cavity; opening the first mold and the second mold to delaminate the transfer film in contact with the molded resin from the carrier film; and taking out an in-mold molded product including a surface and the transfer film on the surface, wherein the taken-out in-mold molded product includes the molded resin, the transfer film sequentially including the adhesive layer in contact with the molded resin and the coloring layer, and the plurality of inorganic filler pieces contained in the coloring layer.

According to the in-mold molded product of the present invention, a poor appearance such that a base (surface of molded resin) inside the transfer film is visually recognized through a crack is prevented even when a molded product is a deep-drawing form. This is because the inorganic filler contained in the coloring layer can stop the growth of a microcrack generated in the coloring layer of the transfer film during injection molding. Specifically, the inorganic filler can stop the growth of the microcrack to prevent the generation of a crack reaching the surface of the resin as the base. This prevents a poor appearance such that the base is visually recognized through the crack.

Also, according to the in-mold molding film of the present invention, the inorganic filler contained in the coloring layer can stop the growth of a microcrack generated in the coloring layer of the transfer film during injection molding even when a molded product is a deep-drawing form. This prevents the generation of a crack reaching the surface of the resin as the base.

According to the method for producing the in-mold molded product of the present invention, the inorganic filler contained in the coloring layer can stop the growth of a microcrack generated in the coloring layer of the transfer film during injection molding even when a molded product is a deep-drawing form. This prevents the generation of a crack reaching the surface of the resin as the base.

Also, as described above, the inorganic filler contained in the coloring layer can stop the growth of a microcrack generated in the coloring layer of the transfer film during injection molding. Thus, curable ink such as two-part curable ink or heat-curable ink, which has lower elasticity than thermoplastic ink and has a high possibility of generation of a crack during injection molding, can be used as the ink forming the coloring layer.

As described above, according to the present invention, when a molded product is a deep-drawing form, even if the coloring layer of the decorative film is formed of curable ink, the inorganic filler can stop the growth of a microcrack generated in the coloring layer to prevent a poor appearance. Thus, according to the present invention, the coloring layer can be formed of curable ink without increasing complexity and the number of steps of forming the coloring layer even when a molded product is a deep-drawing form. According to the present invention, the coloring layer can be formed of curable ink having high heat resistance and high coating hardness, thereby preventing ink flow or ink flying that often occurs for thermoplastic ink. Thus, according to the present invention, an in-mold molded product having a good appearance can be obtained at low cost.

BRIEF DESCRIPTION OF THE DRAWINGS

FIG. 1 is a sectional view showing a layer configuration of a decorative film for in-mold molding in Embodiment 1 of the present invention;

FIG. 4 is an enlarged sectional view of the in-mold molded product in Embodiment 1 of the present invention;

DESCRIPTION OF THE EMBODIMENTS

Figure 2:
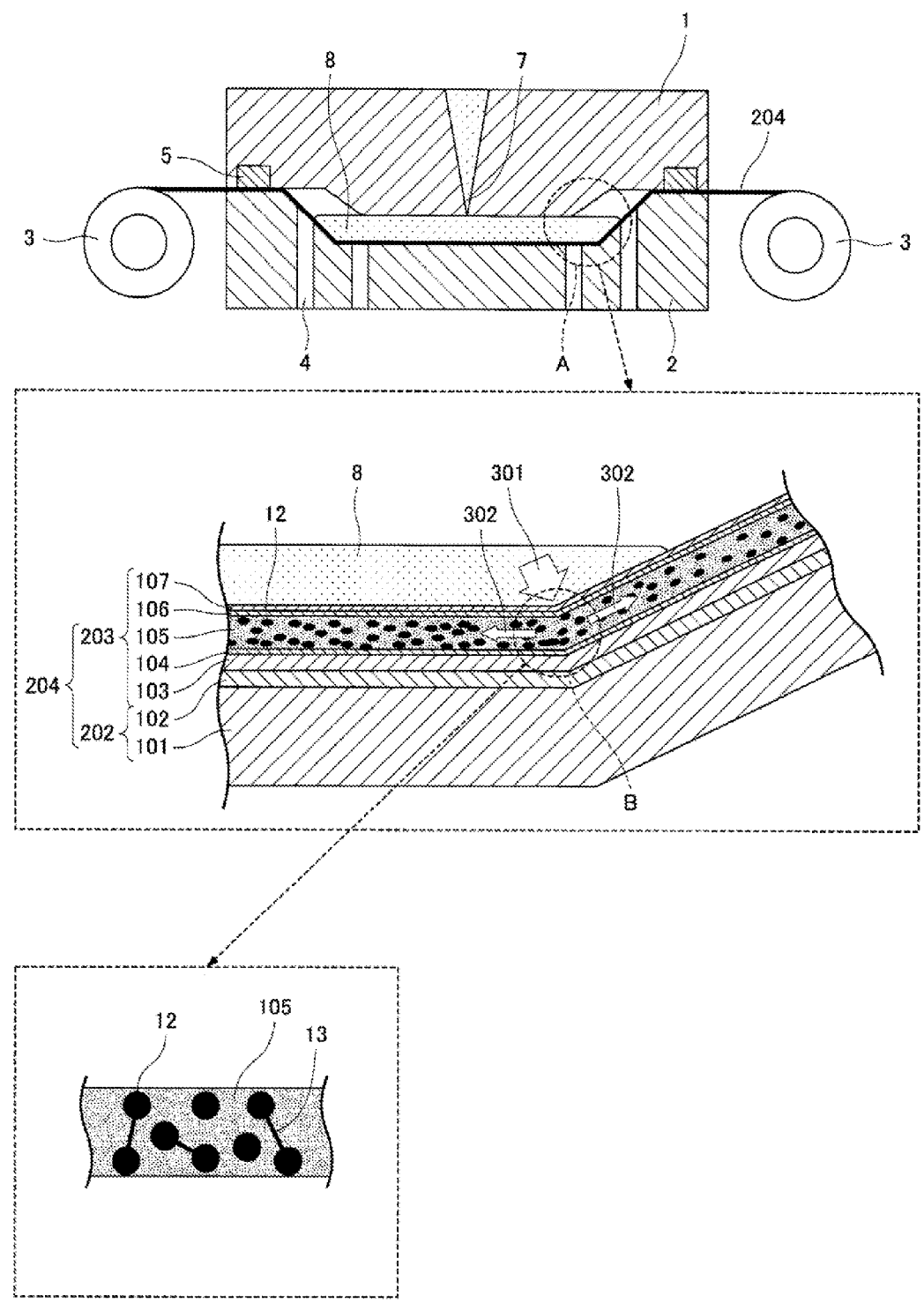
FIG. 2 is a sectional view of a part of a production step of an in-mold molded product in Embodiment 1 of the present invention, an enlarged sectional view of a part in the sectional view, and a further enlarged sectional view of a part in the enlarged sectional view.

Now, embodiments of the present invention will be described with reference to the drawings. The same components will be denoted by the same reference numerals, and overlapping descriptions will be omitted in some cases. The drawings schematically show components for ease of understanding. The thicknesses, lengths, numbers, or the like of the shown components are different from actual ones for convenience of preparation of the drawings.

The present invention is not limitedly applied to a decorative film described in the embodiments below. The present invention may be applied to decorative films having different layer configurations as that of the decorative film described below.

Embodiment 1

Figure 13:
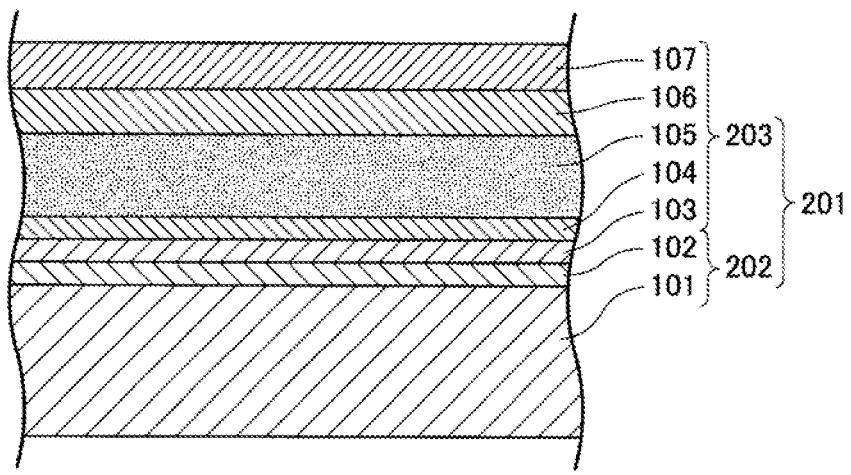
FIG. 13 is a sectional view showing a layer configuration of a decorative film for conventional in-mold molding.
Figure 14:
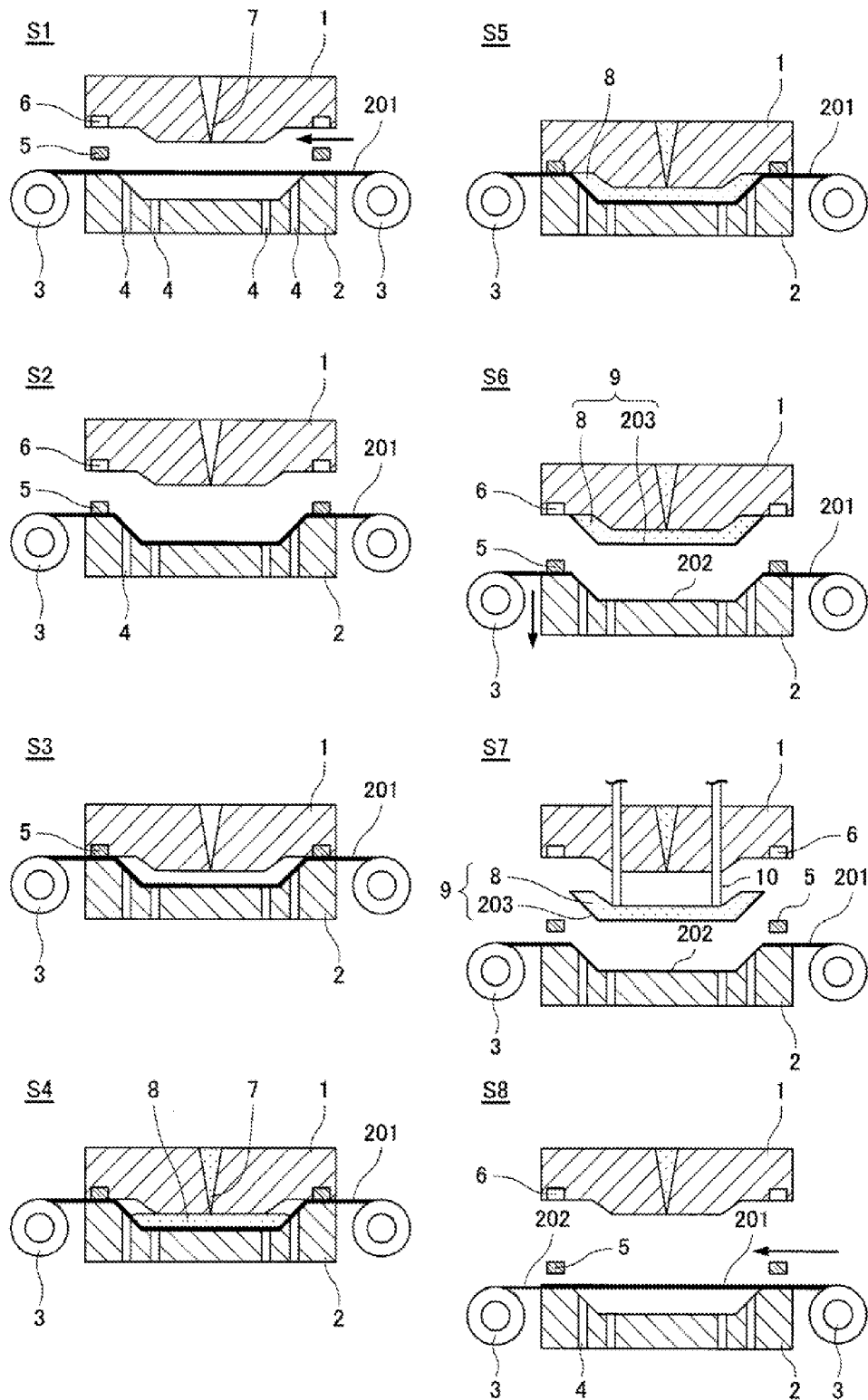
FIG. 14 is a sectional view of a production step of a conventional in-mold molded product.
Figure 15:
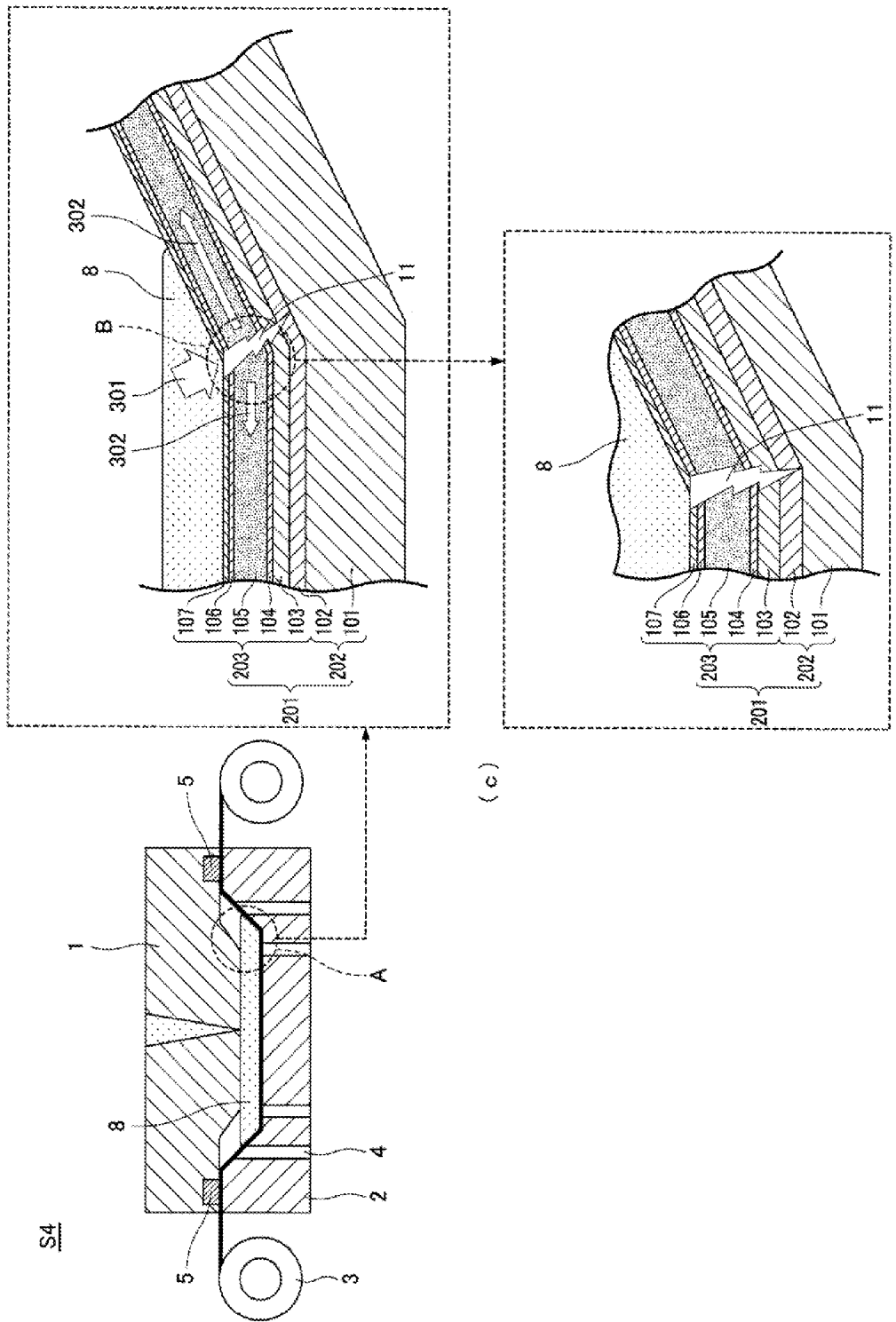
FIG. 15 is a sectional view of a part of the production step of the conventional in-mold molded product, an enlarged sectional view of a part in the sectional view, and a further enlarged sectional view of a part in the enlarged sectional view.

FIG. 1 shows a layer configuration of a decorative film for in-mold molding in Embodiment 1 of the present invention. In FIG. 1, components corresponding to components shown in FIGS. 13 to 15 are denoted by the same reference numerals, and overlapping descriptions will be omitted.

A decorative film 204 shown in FIG. 1 is a continuous film including a carrier film 202 and a transfer film 203.

The carrier film 202 includes a base film 101 and a delamination layer 102. Generally, a thickness of the base film 101 is selected from 20 μm to 100 μm. In Embodiment 1, a base film 101 having a thickness of 50 μm is used. The delamination layer 102 is formed on the base film 101 so that an average thickness of the delamination layer 102 is about 3 μm after drying.

The transfer film 203 is generally formed to have a thickness of 2 to 50 μm. In Embodiment 1, the transfer film 203 is formed so that a thickest part of the transfer film 203 after drying is about 25 μm. Specifically, layers that constitute the transfer film 203 are formed so that average thicknesses after drying are 5 μm for a protective layer or hard coat layer 103, 3 μm for an anchor layer 104, 10 μm for a coloring layer 105, 5 μm for a mask layer 106, and 2 μm for an adhesive layer 107. For the protective layer or hard coat layer 103, a UV after curable layer is used.

In the decorative film 204 in Embodiment 1, inorganic filler pieces 12 are dispersed in the coloring layer 105 of the transfer film 203.

The inorganic filler piece 12 added in the coloring layer 105 basically has an average particle size (catalogue value) equal to or smaller than a thickness of a thinnest part of the coloring layer 105 before injection molding.

A preferable inorganic filler piece 12 has a small average particle size so as to be sufficiently dispersed in the coloring layer 105 depending on its shape. This is because if the inorganic filler pieces 12 cannot be sufficiently dispersed in the coloring layer 105, the inorganic filler pieces 12 in the number required for preventing the growth of a microcrack to prevent a poor appearance cannot exist in a part where a crack that can be visually recognized is easily generated, such as a part corresponding to a corner of a molded product. Also, as describe later, if the inorganic filler pieces 12 are sufficiently dispersed in the coloring layer 105, seeing color of a base through the transfer film 203 is prevented at the corner of the molded product with the thin transfer film 203. In view of dispersibility of the inorganic filler piece 12 in the coloring layer 105, for example, an average particle size of a spherical inorganic filler piece 12 is preferably 0.2 to 2 μm when an average thickness of the coloring layer 105 after drying is 10 μm. However, the average particle size of the inorganic filler piece 12 is not particularly limited as long as the inorganic filler piece 12 can prevent the growth of the microcrack generated in the coloring layer 105 during injection molding to prevent a poor appearance.

The inorganic filler piece 12 is preferably made of silica or talc that is translucent and does not affect color of ink. However, the type of the inorganic filler piece 12 is not particularly limited as long as the inorganic filler piece 12 can prevent the growth of a microcrack generated in the coloring layer 105 during injection molding to prevent a poor appearance.

A method for producing the inorganic filler piece 12 is not particularly limited as long as the method can produce inorganic filler pieces that can prevent the growth of a microcrack generated in the coloring layer 105 during injection molding to prevent a poor appearance. For example, silica includes spherical silica, colloidal silica, ground silica, porous silica, or the like depending on machining methods. However, a method for machining silica is not particularly limited as long as the method can produce silica that can prevent the growth of a microcrack generated in the coloring layer 105 during injection molding to prevent a poor appearance.

In Embodiment 1, as the inorganic filler pieces 12, spherical silica having an average particle size of 0.2 μm is dispersed in ink, and then the ink having the spherical silica is used to form a coloring layer 105 having an average thickness after drying of 10 μm and a thickness of a thinnest part of 9 μm. Urethane type two-part curable ink is used as ink forming the coloring layer 105. The urethane type two-part curable ink is prepared by adding a urethane type curing agent to thermoplastic resin. In particular, 5 parts by weight of inorganic filler pieces 12 are dispersed in 100 parts by weight of ink, and then an uncured coloring layer 105 having at least enough hardness to keep predetermined design is formed by screen printing and a succeeding drying step.

The number of added inorganic filler pieces 12 is not particularly limited as long as the inorganic filler pieces 12 can prevent the growth of a microcrack generated in the coloring layer 105 during injection molding to prevent a poor appearance. However, it is desirably considered that even with the same number of added inorganic filler pieces 12, viscosity of ink differs depending on types of ink and average particle size of the inorganic filler pieces 12. This is because highly viscous ink is difficult to handle in printing or coating. Generally, with increasing number of added inorganic filler pieces 12, the viscosity of ink tends to increase. It has been found that when spherical silica having an average particle size of 0.2 µm is used as the inorganic filler piece 12, 0.5 to 30 parts by weight of spherical silica are preferably dispersed in 100 parts by weight of ink in terms of viscosity. Inorganic filler pieces 12 having different average particle sizes may be dispersed in the ink in terms of adjustment of viscosity of the ink.

The ink may be basically curable ink having a crosslinked structure, such as two-part curable ink cured by a polymerization reaction of two parts, heat-curable ink cured by heat, UV curable ink cured by ultraviolet rays, or EB curable ink cured by an electron beam, and is not particularly limited.

Resin as main material of ink is not particularly limited. Resin as main material of ink may be selected from acrylic resin, polyester resin, vinyl chloride resin, or the like according to compatibility with material used for a layer adjacent to the coloring layer 105.

A method for forming the coloring layer 105 using the ink in which the inorganic filler pieces 12 are dispersed is not particularly limited. As in the case where a coloring layer of a general decorative film or a layer other than the coloring layer of the general decorative film is formed, a screen printer, a gravure printer, an inkjet printer, or a coater may be used. A preferable range of viscosity of ink differs depending on methods for forming the coloring layer. Thus, it is preferable that the type of ink or the number of added inorganic filler pieces 12 is selected according to the method for forming the coloring layer to adjust viscosity of ink.

A process for producing an in-mold molded product using the decorative film 204 described above is the same as the process for producing the in-mold molded product shown in FIG. 14, and thus descriptions thereof will be omitted. The process for producing the in-mold molded product using the decorative film 204 shown in FIG. 1 is different from the process for producing the in-mold molded product shown in FIG. 14 only in that the decorative film 204 shown in FIG. 1 is used instead of the decorative film 201 shown in FIG. 13 as an in-mold molding film placed between the stationary mold 1 as an example of a first or second mold and the movable mold 2 as an example of the second or first mold.

Next, with reference to FIG. 2, it will be described that the inorganic filler pieces 12 dispersed in the coloring layer 105 prevent the growth (extension) of a microcrack generated in the coloring layer 105.

FIG. 2 is a sectional view (upper figure) of a step of filling a cavity of a mold with molten injection molding resin 8, and an enlarged sectional view (middle figure) of a part A in the sectional view (upper figure). The part A corresponds to a corner of a molded product. Also, FIG. 2 is a further enlarged sectional view (lower figure) of a part B in the enlarged sectional view (middle figure) of the part A. Specifically, the enlarged sectional view (lower figure) of the part B shows the part corresponding to the corner of the molded product in a further enlarged manner. In FIG. 2, components corresponding to components shown in FIGS. 1 and 13 to 15 are denoted by the same reference numerals, and overlapping descriptions will be omitted.

As shown in the enlarged sectional view (middle figure) of the part A in FIG. 2, when the molten injection molding resin 8 fills the cavity of the mold, injection pressure 301 of the injection molding resin 8 is applied to the decorative film 204, and tensile stress 302 thereby is generated in the decorative film 204. Since the injection pressure of the injection molding resin 8 is highest in the part corresponding to the corner of the molded product, tensile stress due to the injection pressure of the injection molding resin 8 is also focused most on the part corresponding to the corner of the molded product. When a molded product is a deep-drawing form, before the molten injection molding resin 8 is poured into the cavity of the mold, the decorative film 204 does not tightly adhere to a cavity surface of the movable mold 2 in the part corresponding to the corner of the molded product, and in the part, there is a gap between the cavity surface of the movable mold 2 and the decorative film 204. Thus, high injection pressure 301 is applied from the injection molding resin 8 to the decorative film 204 in the part corresponding to the corner of the molded product. Further, high tensile stress 302 due to the injection pressure 301 of the injection molding resin 8 is generated in the decorative film 204, and also there is the gap between the cavity surface of the movable mold 2 and the decorative film 204 in the part corresponding to the corner of the molded product. Thus, when a molded product is a deep-drawing form, the decorative film 204 significantly stretches in the part corresponding to the corner of the molded product during injection of the molten injection molding resin 8. Thus, a heavy load is applied to the decorative film 204 in the part corresponding to the corner of the molded product. Also, the decorative film 204 is thinnest in the part corresponding to the corner of the molded product. In Embodiment 1, the coloring layer 105 has a thickness of about 5 µm at the corner of the molded product that is the thinnest part of the coloring layer 105 after injection molding.

As described above, when a molded product is a deep-drawing form, a heavy load is applied to the decorative film 204 in the part corresponding to the corner of the molded product during injection of the injection molding resin 8. Thus, if curable ink such as two-part curable ink or heat-curable ink, which has lower elasticity than thermoplastic ink, is used, ink forming the coloring layer 105 cannot bear the heavy load applied to the decorative film 204 in the part corresponding to the corner of the molded product, and as shown in the enlarged sectional view (lower figure) of the part B in FIG. 2, a microcrack 13 is generated in the coloring layer 105. However, the microcrack cannot be visually recognized. Thus, the microcrack 13 in the enlarged sectional view (lower figure) in the part B in FIG. 2 is conceptually shown. This also applies to the microcrack shown in other drawings.

However, in the decorative film 204 in Embodiment 1, the spherical inorganic filler pieces 12 having an average particle size of 0.2 µm are dispersed in the coloring layer 105 having an average thickness after drying of 10 µm. Thus, even if the microcrack 13 is generated, the growth of the microcrack 13 can be stopped between inorganic filler pieces 12 at a maximum as shown in the enlarged sectional view (lower figure) of the part B in FIG. 2 to prevent further extension (growth) of the microcrack 13. The microcrack 13 is generated from an interface between the inorganic filler piece 12 and the ink forming the coloring layer 105. This prevents the generation of a crack extending through the coloring layer 105 even at the corner of the molded product where the coloring layer 105 has a smaller thickness than the average thickness of the coloring layer 105.

In the process for producing the in-mold molded product, depending on conditions of the process, the microcrack 13 may be generated in the coloring layer 105 in a step other than the step of filling with the injection molding resin 8, for example, a step of cooling the injection molding resin 8. However, in whatever step the microcrack 13 is generated, the growth of the microcrack 13 can be stopped by the inorganic filler piece 12 to prevent the extension (growth) to a crack extending through the coloring layer 105.

Figure 3:
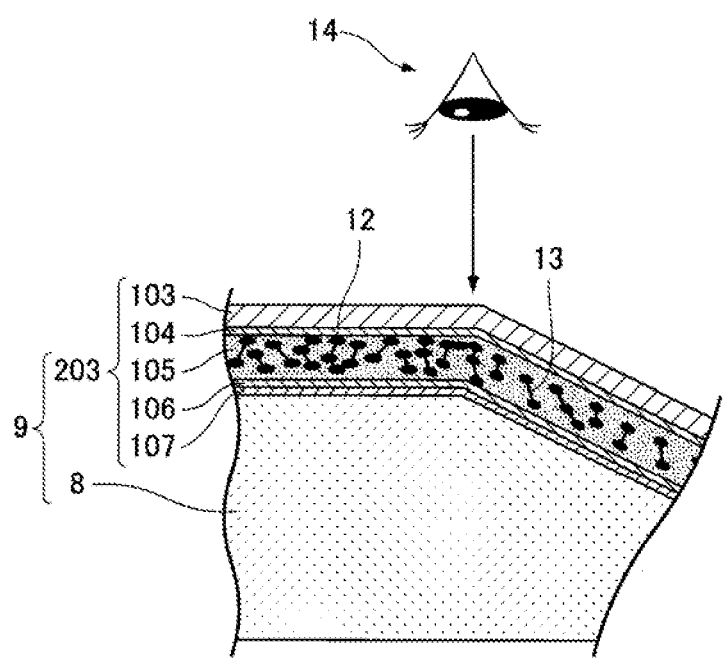
FIG. 3 is an enlarged sectional view of the in-mold molded product in Embodiment 1 of the present invention.

As described above, when a molded product is a deep-drawing form, if curable ink such as two-part curable ink or heat-curable ink, which has lower elasticity than thermoplastic ink, is used, the microcrack 13 is generated in the process for producing the in-mold molded product. However, even if the microcrack 13 is generated, the growth of the microcrack 13 can be stopped by the inorganic filler piece 12. This prevents the generation of a crack extending through the coloring layer 105. If a crack extending through the coloring layer 105 is not generated, as shown in FIG. 3, a base (surface of the molded injection molding resin 8) is not visually recognized through the crack even when a corner of an in-mold molded product 9 taken out from the mold is visually checked by eyes 14 from the side of the protective layer or hard coat layer 103.

Thus, according to Embodiment 1, an in-mold molded product 9 having a good appearance can be obtained in which a base (surface of the molded injection molding resin 8) is not visually recognized at the corner of the in-mold molded product 9 even when the in-mold molded product 9 is a deep-drawing form.

Figure 5:
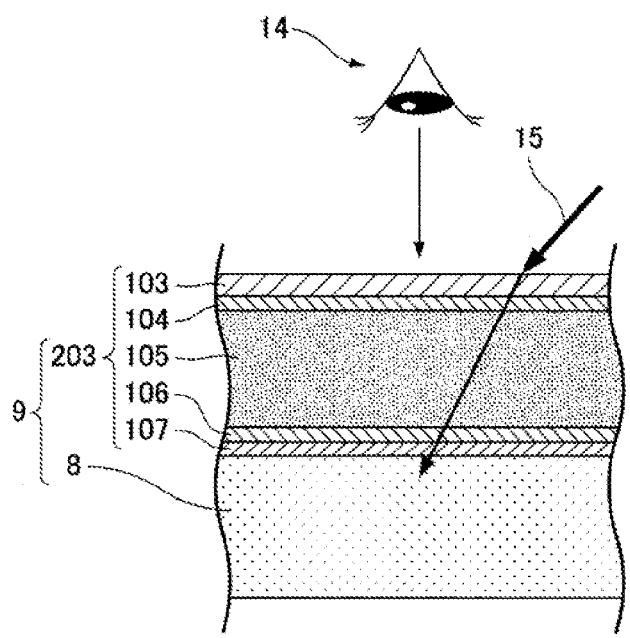
FIG. 5 is an enlarged sectional view of a conventional in-mold molded product.

Next, with reference to FIGS. 4 and 5, it will be described that the inorganic filler pieces 12 are dispersed in the coloring layer 105 to prevent seeing color of the base through the transfer film 203. FIG. 4 is an enlarged sectional view of the in-mold molded product 9 produced using the decorative film 204 shown in FIG. 1, and FIG. 5 is an enlarged sectional view of the in-mold molded product 9 produced using a conventional decorative film 201 shown in FIG. 13. In FIGS. 4 and 5, components corresponding to components shown in FIGS. 1 to 3 and 13 to 15 are denoted by the same reference numerals, and overlapping descriptions will be omitted.

At the corner of the deep draw molded product, the decorative film is stretched, and thus the coloring layer 105 is thin at the stretched part. In Embodiment 1, the inorganic filler pieces 12 are dispersed in the coloring layer 105. Thus, as shown in FIG. 4, even if the coloring layer 105 is thin, light 15 entering from the side of the protective layer or hard coat layer 103 is scattered by the inorganic filler pieces 12 in the coloring layer 105. This prevents the light 15 from passing through to the base. On the other hand, in the case of using the conventional decorative film 201 shown in FIG. 13, if the coloring layer 105 is thin, the light 15 entering from the side of the protective layer or hard coat layer 103 easily passes through to the base as shown in FIG. 5. Thus, the base may be seen through the transfer film 203. Thus, using the decorative film 204 in Embodiment 1 prevents seeing color of the base through the transfer film 203 at the corner of the molded product.

Embodiment 1 has been described on the coloring layer 105 including one layer. However, depending on design such as pictures or patterns that decorate the surface of the molded product, the coloring layer sometimes includes a plurality of layers. In that case, the inorganic filler pieces 12 may be dispersed in all layers that constitute the coloring layer or only a part of the layers. For example, when the coloring layer includes three layers, the inorganic filler pieces 12 may be dispersed in all three layers, or the inorganic filler piece 12 may be dispersed in one or two layers which is most likely to have a crack among the three layers, and no inorganic filler piece 12 may be dispersed in the remaining layer or layers. This also applies to Embodiments 2 and 3 described in detail below.

Embodiment 2

The in-mold molded product in Embodiment 1 described above does not basically causes problems. However, when the molded product has a deeper draw, that is, the depth of the molded product is deeper, and the coloring layer 105 is more likely to be stretched and be thinned at the corner of the molded product, Embodiment 2 can provide an in-mold molded product having a better appearance.

Embodiment 2 is different from Embodiment 1 in shape of an inorganic filler piece 12 dispersed in a coloring layer 105. Specifically, the inorganic filler piece 12 dispersed in the coloring layer 105 of a decorative film 204 has a scale shape or a flat plate shape. Embodiment 2 will be now described mainly on differences from Embodiment 1 above.

Figure 6:
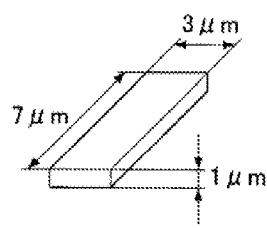
FIG. 6 is a perspective view showing an example of an inorganic filler in Embodiment 2 of the present invention.

FIG. 6 is a perspective view showing an example of the inorganic filler piece 12 in Embodiment 2. In Embodiment 2, as shown in FIG. 6, as an inorganic filler piece 12 added to the coloring layer 105 of the decorative film 204, an inorganic filler piece 12 having a scale shape or a flat plate shape is used. The inorganic filler piece 12 having a scale shape or a flat plate shape is hereinafter referred to as a scale-shaped inorganic filler piece 12a. Such a scale-shaped inorganic filler piece 12a is used to further prevent the generation of a crack extending through the coloring layer 105. Further, seeing color of the base of the in-mold molded product through a transfer film 203 is also prevented.

In the case where an average thickness of the coloring layer 105 after drying is, for example, 15 μm, the scale-shaped inorganic filler piece 12a is desirably sized so that an average particle size (catalogue value) is 1 to 7 μm half or less than the average thickness of the coloring layer 105, a ratio between a short axis and a long axis (aspect ratio) is 0.9 to 0.3, and a thickness is 0.1 to 3.5 μm half or less than the average particle size. When an inorganic filler piece has a scale shape or a flat plate shape, a larger value of the aspect ratio, that is, the long axis is the average particle size. In Embodiment 2, as shown in FIG. 6, the scale-shaped inorganic filler piece 12a is used having an average particle size (long axis) of 7 μm, a short axis of 3 μm, and a thickness of 1 μm. However, the size of the scale-shaped inorganic filler piece 12a is not particularly limited, but may be a size that prevents the generation of a crack extending through the coloring layer 105.

The number of added scale-shaped inorganic filler pieces 12a is not particularly limited as long as the inorganic filler pieces 12a prevent the generation of a crack extending through the coloring layer 105. However, the number of added scale-shaped inorganic filler pieces 12a is desirably selected in view of viscosity of ink forming the coloring layer 105. In Embodiment 2, 10 to 30 parts by weight of scale-shaped inorganic filler pieces 12a are dispersed in 100 parts by weight of ink.

Next, with reference to FIGS. 7 and 8, it will be described that using the scale-shaped inorganic filler piece 12a more easily prevents the growth (extension) of a microcrack 13 generated in the coloring layer 105.

Figure 7:
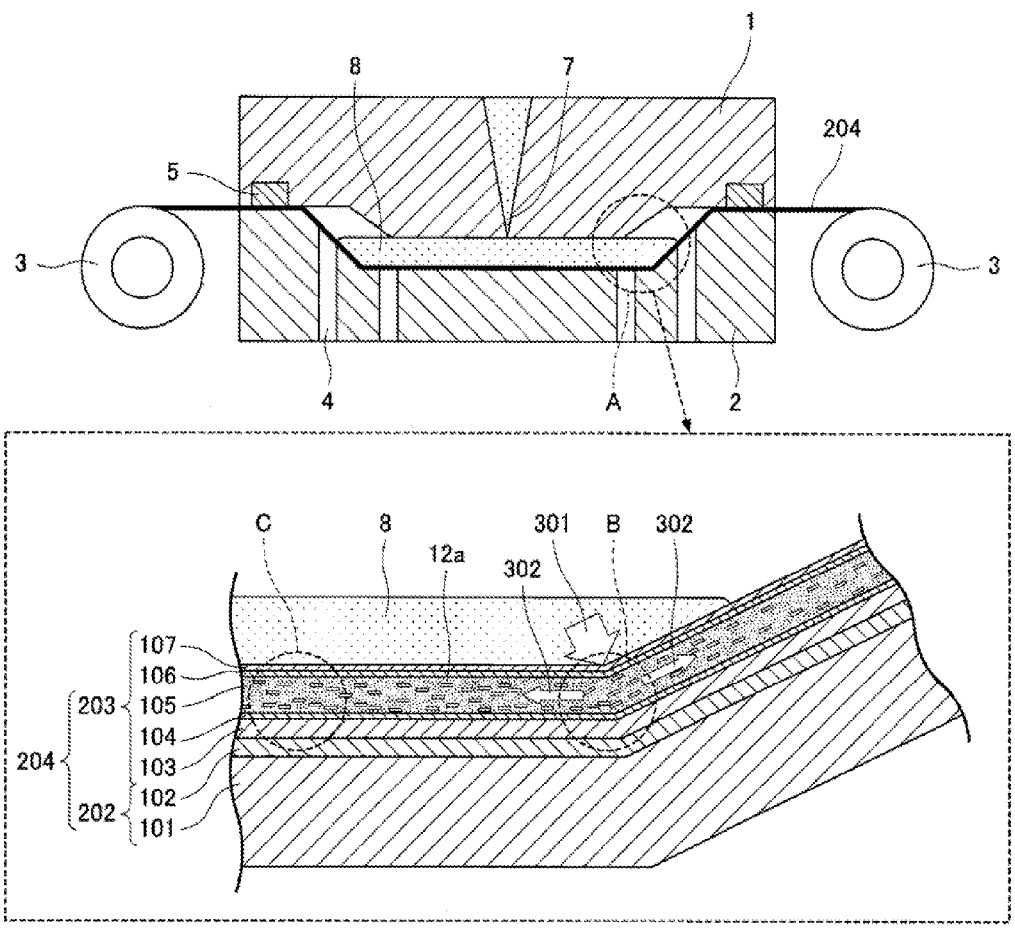
FIG. 7 is a sectional view of a part of a production step of an in-mold molded product in Embodiment 2 of the present invention, and an enlarged sectional view of a part in the sectional view.

FIG. 7 is a sectional view (upper figure) of a step of filling a cavity of a mold with molten injection molding resin 8, and an enlarged sectional view (lower figure) of a part A in the sectional view (upper figure). The part A corresponds to a corner of a molded product. FIG. 8 is a further enlarged sectional view (right figure) of a part B in the enlarged sectional view (lower figure) of the part A in FIG. 7, and a further enlarged sectional view (left figure) of a part C in the enlarged sectional view (lower figure) of the part A in FIG. 7. The enlarged sectional view (right figure) of the part B in FIG. 8 shows the part corresponding to the corner of the molded product in a further enlarged manner. The enlarged sectional view (left figure) of the part C in FIG. 8 shows a part away from the part corresponding to the corner of the molded product in a further enlarged manner. In FIGS. 7 and 8, components corresponding to components shown in FIGS. 1 to 5 and 13 to 15 are denoted by the same reference numerals, and overlapping descriptions will be omitted.

As described above, in the process for producing a deep draw in-mold molded product, in the step of filling the cavity of the mold with the molten injection molding resin 8, stress 301 applied from the injection molding resin 8 to the decorative film 204 is focused most on the part corresponding to the corner of the molded product as shown in the enlarged sectional view (lower figure) of the part A in FIG. 7, and the stress 301 generates stress 302 that stretches the coloring layer 105. When a molded product is a deep-drawing form, there is a gap between a cavity surface of a movable mold 2 and the decorative film 204 in the part corresponding to the corner of the molded product. Thus, as shown in FIG. 8, the coloring layer 105 is stretched and is thinned in the part corresponding to the corner of the molded product.

Figure 8:
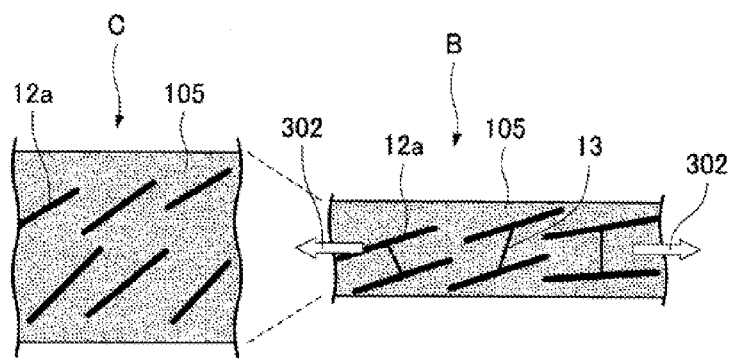
FIG. 8 is a further enlarged sectional view of a part in the enlarged sectional view in FIG. 7.

As such, in the process that the coloring layer 105 becomes thin, the scale-shaped inorganic filler piece 12a is arranged so that a long axis direction of the scale-shaped inorganic filler piece 12a is along a stretching direction of the coloring layer 105 together with the stretch of the coloring layer 105 as shown in the enlarged sectional view (right figure) of the part B in FIG. 8. The scale-shaped inorganic filler pieces 12a are thus arranged to reduce a distance between the scale-shaped inorganic filler pieces 12a, and easily stop the growth, in a thickness direction of the coloring layer 105, of the microcrack 13 generated between the scale-shaped inorganic filler piece 12a during arrangement of the scale-shaped inorganic filler pieces 12a. Specifically, in the thinnest part of the transfer film 203, the long axis of the scale-shaped inorganic filler piece 12a is aligned in the stretching direction of the transfer film 203, and thus the scale-shaped inorganic filler pieces 12a can easily prevent the growth of the microcrack 13 in the thickness direction of the transfer film 203. Also, the arrangement of the scale-shaped inorganic filler pieces 12a prevents light entering from a side of a protective layer or hard coat layer 103 from passing through to a base (surface of molded injection molding resin 8). Thus, the scale-shaped inorganic filler piece 12a is effective for preventing seeing color of the base through the transfer film 203 at the corner of the molded product having a deeper draw.

Figure 9:
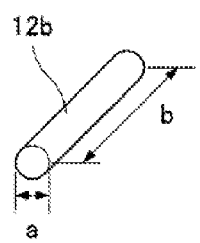
FIG. 9 is a perspective view showing another example of an inorganic filler in Embodiment 2 of the present invention.

The case where the scale-shaped inorganic filler piece 12a is selected as an inorganic filler piece 12 added to the coloring layer 105 has been described, but an inorganic filler piece 12 having a rod shape as shown in FIG. 9 may be selected. The inorganic filler piece 12 having a rod shape will be hereinafter referred to as a rod-shaped inorganic filler piece 12b. As same as using the scale-shaped inorganic filler piece 12a, using the rod-shaped inorganic filler piece 12b further prevents the generation of a crack extending through the coloring layer 105, and further prevents seeing color of the base of the in-mold molded product through the transfer film 203.

The size of the rod-shaped inorganic filler piece 12b is not particularly limited, but may be a size that can prevent the generation of a crack extending through the coloring layer 105. For example, in the case where a rod-shaped inorganic filler piece 12b is dispersed in a coloring layer 105 having an average thickness after drying of 15 μm, a rod-shaped inorganic filler piece 12b having a short axis a of 9 μm and a long axis b of 35 μm (aspect ratio of 4) or a rod-shaped inorganic filler piece 12b having a short axis a of 3.5 μm and a long axis b of 20 μm (aspect ratio of 6) may be used. Also when an inorganic filler piece has a rod shape, a larger value of the aspect ratio, that is, the long axis is an average particle size.

The number of added rod-shaped inorganic filler pieces 12b is not particularly limited as long as inorganic filler pieces 12b prevent the generation of a crack extending through the coloring layer 105. For example, in the case where the rod-shaped inorganic filler pieces 12b are dispersed in the coloring layer 105 having an average thickness after drying of 15 μm, 10 to 30 parts by weight of rod-shaped inorganic filler pieces 12b are preferably dispersed in 100 parts by weight of ink in view of viscosity of ink forming the coloring layer 105.

Embodiment 3

Figure 10:
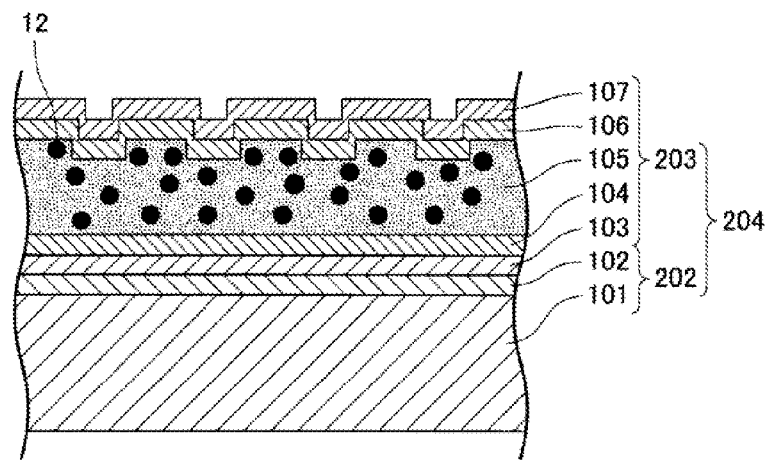
FIG. 10 is a sectional view showing a layer configuration of a decorative film for in-mold molding in Embodiment 3 of the present invention.

FIG. 10 shows a layer configuration of a decorative film for in-mold molding in Embodiment 3 of the present invention. In FIG. 10, components corresponding to components shown in FIGS. 1 to 9 and 13 to 15 are denoted by the same reference numerals, and overlapping descriptions will be omitted.

As shown in FIG. 10, Embodiment 3 is different from Embodiment 1 described above in that an interface between a coloring layer 105 and a mask layer 106, an interface between the mask layer 106 and an adhesive layer 107, and a surface of the adhesive layer 107 (surface of the adhesive layer 107 on a side opposite to the coloring layer 105) have irregularities. As such, the interface between the coloring layer 105 and the mask layer 106, and the interface between the mask layer 106 and the adhesive layer 107 have irregularities, thereby preventing delamination between the coloring layer 105 and the mask layer 106 and between the mask layer 106 and the adhesive layer 107. The surface of the adhesive layer 107 has irregularities, and thus heat is well transferred from the molten injection molding resin 8 to the decorative film 204 during injection molding to prevent the generation of a serious crack.

FIG. 10 shows a spherical inorganic filler piece 12 as in Embodiment 1 described above. However, the shape of the inorganic filler piece 12 is not particularly limited. For example, the scale-shaped inorganic filler piece 12a or the rod-shaped inorganic filler piece 12b described in Embodiment 2 may be used.

Now, Embodiment 3 will be described mainly on differences from Embodiments 1 and 2 described above. As shown in FIG. 10, to form irregularities in the interface (surface of the coloring layer 105 on the side of the adhesive layer 107) between the coloring layer 105 and the mask layer 106, the number of added inorganic filler pieces 12 may be adjusted according to an average particle size (catalogue value) of the inorganic filler piece 12. For example, in the case where the coloring layer 105 having an average thickness after drying of 10 μm is formed as in Embodiment 1, 10 to 30 parts by weight of inorganic filler pieces 12 having an average particle size (catalogue value) of 0.2 to 2 μm are added to 100 parts by weight of ink irrespective of the shape of the inorganic filler piece 12. This increases surface roughness of the coloring layer 105 after printing or coating, and more noticeably provides irregularities in the surface of the coloring layer 105.

As an example, when 10 parts by weight of inorganic filler pieces 12 having an average particle size of, for example, 0.2 μm are dispersed in 100 parts by weight of ink, average roughness Ra of the surface of the coloring layer 105 is 0.13. On the other hand, average roughness Ra when the inorganic filler pieces 12 are not dispersed is 0.016. Thus, the average roughness Ra of the surface of the coloring layer 105 is eight times higher than that of which the inorganic filler pieces 12 are not dispersed, thereby noticeably providing irregularities in the surface of the coloring layer 105. As such, the average roughness of the surface of the coloring layer 105 is eight times higher than that of which the inorganic filler pieces 12 are not dispersed, and this is more effective for preventing delamination between the coloring layer 105 and the mask layer 106, preventing delamination between the mask layer 106 and the adhesive layer 107, and increasing heat conductivity from the molten injection molding resin 8 to the decorative film 204. Even in the case of using an inorganic filler piece 12 having an average particle size of more than 0.2 μm, the number of added inorganic filler pieces 12 is adjusted so that the average roughness of the surface of the coloring layer 105 is eight times higher than that of which the inorganic filler piece 12 is not dispersed. Then, the same advantage as when the average particle size of the inorganic filler piece 12 is 0.2 μm can be obtained in preventing delamination between the coloring layer 105 and the mask layer 106, preventing delamination between the mask layer 106 and the adhesive layer 107, and increasing heat conductivity from the molten injection molding resin 8 to the decorative film 204.

The average particle size of the inorganic filler piece 12 and the number of added inorganic filler pieces 12 above described are examples, and the average particle size of the inorganic filler piece 12 and the number of added inorganic filler pieces 12 are not particularly limited as long as irregularities can be formed in the interface between the coloring layer 105 and the mask layer 106, the interface between the mask layer 106 and the adhesive layer 107, and the surface of the adhesive layer 107.

After the coloring layer 105 is formed, the mask layer 106 is formed by printing or coating on the surface of the coloring layer 105 having irregularities. Then, the surface of the mask layer 106 is not easily smoothed because of the irregularities in the coloring layer 105. In other words, irregularities are also formed in the surface of the mask layer 106. Similarly, if the adhesive layer 107 is formed by printing or coating on the surface of the mask layer 106 having irregularities, the surface of the adhesive layer 107 is not easily smoothed because of the irregularities in the mask layer 106. In other words, irregularities are also formed in the surface of the adhesive layer 107.

In particular, when the average thickness of the mask layer 106 after drying is 5 μm or less, the surface of the mask layer 106 has irregularities of substantially the same surface roughness as the coloring layer 105. When the average thickness of the mask layer 106 after drying is 5 μm or less, and the average thickness of the adhesive layer 107 after drying is also 5 μm or less, the surface of the adhesive layer 107 has irregularities of substantially the same surface roughness as the coloring layer 105.

When the mask layer 106 is formed on the surface of the coloring layer 105 having irregularities, resin forming the mask layer 106 fits into recesses in the irregularities in the coloring layer 105. This increases an area of the interface between the coloring layer 105 and the mask layer 106, and thus increases adhesion between the coloring layer 105 and the mask layer 106 to prevent delamination between the coloring layer 105 and the mask layer 106.

Similarly, when the adhesive layer 107 is formed on the surface of the mask layer 106 having irregularities, resin forming the adhesive layer 107 fits into recesses in the irregularities in the mask layer 106. This increases an area of the interface between the mask layer 106 and the adhesive layer 107, and thus increases adhesion between the mask layer 106 and the adhesive layer 107 to prevent delamination between the mask layer 106 and the adhesive layer 107.

The process for producing the in-mold molded product using the decorative film 204 described above is the same as the process for producing the in-mold molded product shown in FIG. 14, and thus descriptions thereof will be omitted. The process for producing the in-mold molded product using the decorative film 204 shown in FIG. 10 is different from the process for producing the in-mold molded product shown in FIG. 14 only in that the decorative film 204 shown in FIG. 10 is used instead of the decorative film 201 shown in FIG. 13 as an in-mold molding film placed between a stationary mold 1 as an example of a first or second mold and a movable mold 2 as an example of a second or first mold.

Figure 11:
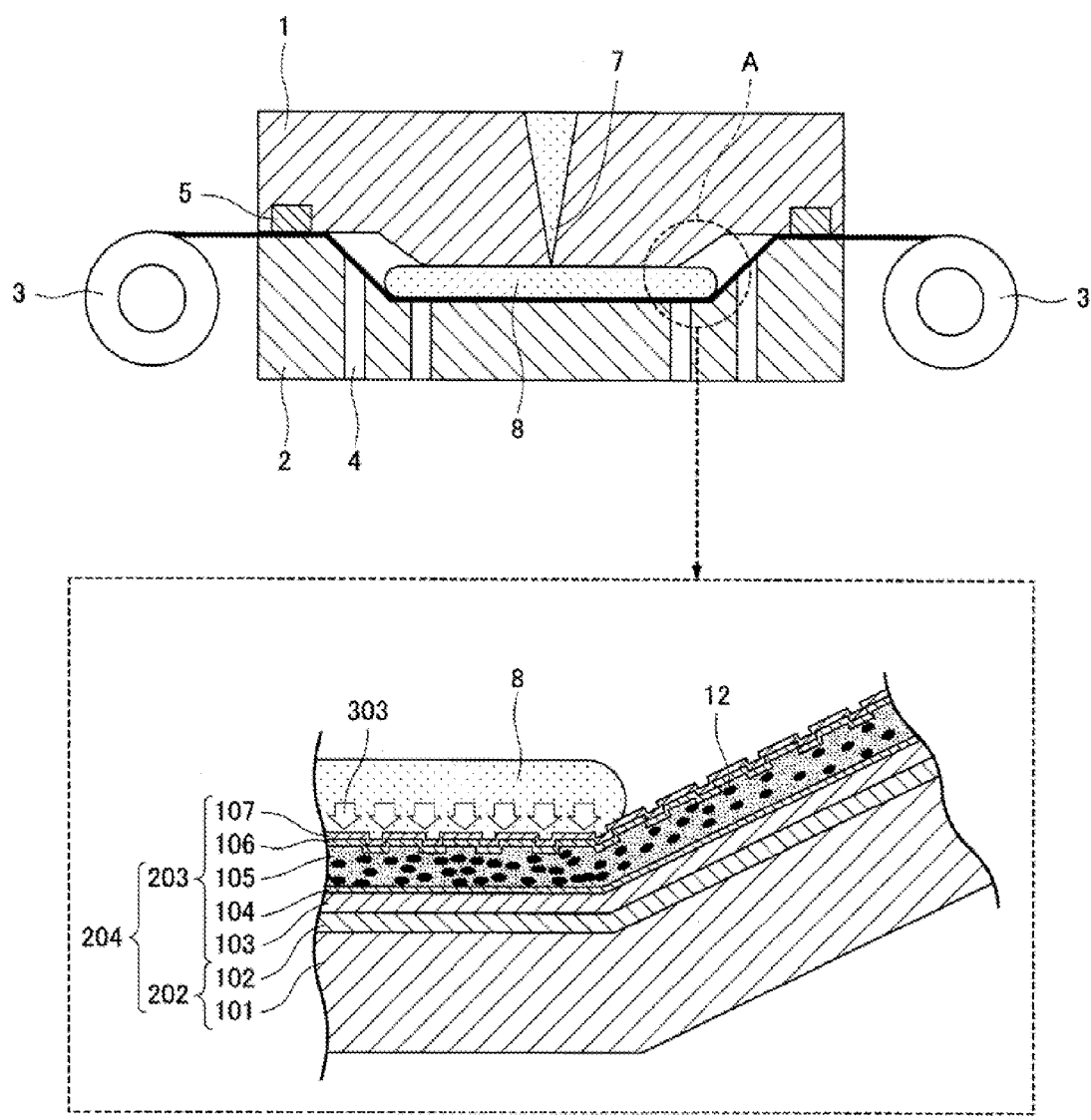
FIG. 11 is a sectional view of a part of a production step of the in-mold molded product in Embodiment 3 of the present invention, and an enlarged sectional view of a part in the sectional view.

Next, with reference to FIG. 11, it will be described that producing the in-mold molded product using the decorative film 204 shown in FIG. 10 increases heat conductivity from the molten injection molding resin 8 to the decorative film 204 during injection molding. FIG. 11 is a sectional view (upper figure) of a step of filling a cavity of a mold with molten injection molding resin 8, and an enlarged sectional view (lower figure) of a part A in the sectional view (upper figure). The part A corresponds to a corner of a molded product. In FIG. 11, components corresponding to components shown in FIGS. 1 to 10 and 13 to 15 are denoted by the same reference numerals, and overlapping descriptions will be omitted.

As shown in FIG. 11, in the step of pouring the molten injection molding resin 8 into the mold, the surface of the adhesive layer 107 has rough irregularities as shown in the enlarged sectional view (lower figure) of the part A. Thus, the molten injection molding resin 8 fits into recesses in the irregularities in the adhesive layer 107 to increase an area of the interface between the adhesive layer 107 and the injection molding resin 8. Thus, heat from the molten injection molding resin 8 is well transferred to the decorative film 204, and the heat from the molten injection molding resin 8 heats and easily stretches the decorative film 204. In the enlarged sectional view (lower figure) of the part A in FIG. 11, heat transferred from the molten injection molding resin 8 to the decorative film 204 is shown by arrow 303.

As such, the heat from the molten injection molding resin 8 easily stretches the decorative film 204, and then the decorative film 204 easily fits a shape of a cavity surface of the mold at a corner of the cavity of the mold (part corresponding to the corner of the molded product) with a gap between the cavity surface of the mold and the decorative film 204. This reduces loads applied to the decorative film 204 in the part corresponding to the corner of the molded product, thereby further preventing the generation of a crack extending through the coloring layer 105.

Further, efficiency of heat transfer from the molten injection molding resin 8 is increased to promote a crosslinking reaction of curable ink such as two-part curable ink or heat-curable ink forming the coloring layer 105. This facilitates complete curing of the coloring layer 105.

Also, the molten injection molding resin 8 fits into the recesses in the irregularities in the adhesive layer 107 to increase the area of the interface between the injection molding resin 8 and the adhesive layer 107. This increases adhesion between the injection molding resin 8 and the adhesive layer 107, and prevents delamination between the injection molding resin 8 and the adhesive layer 107.

Figure 12:
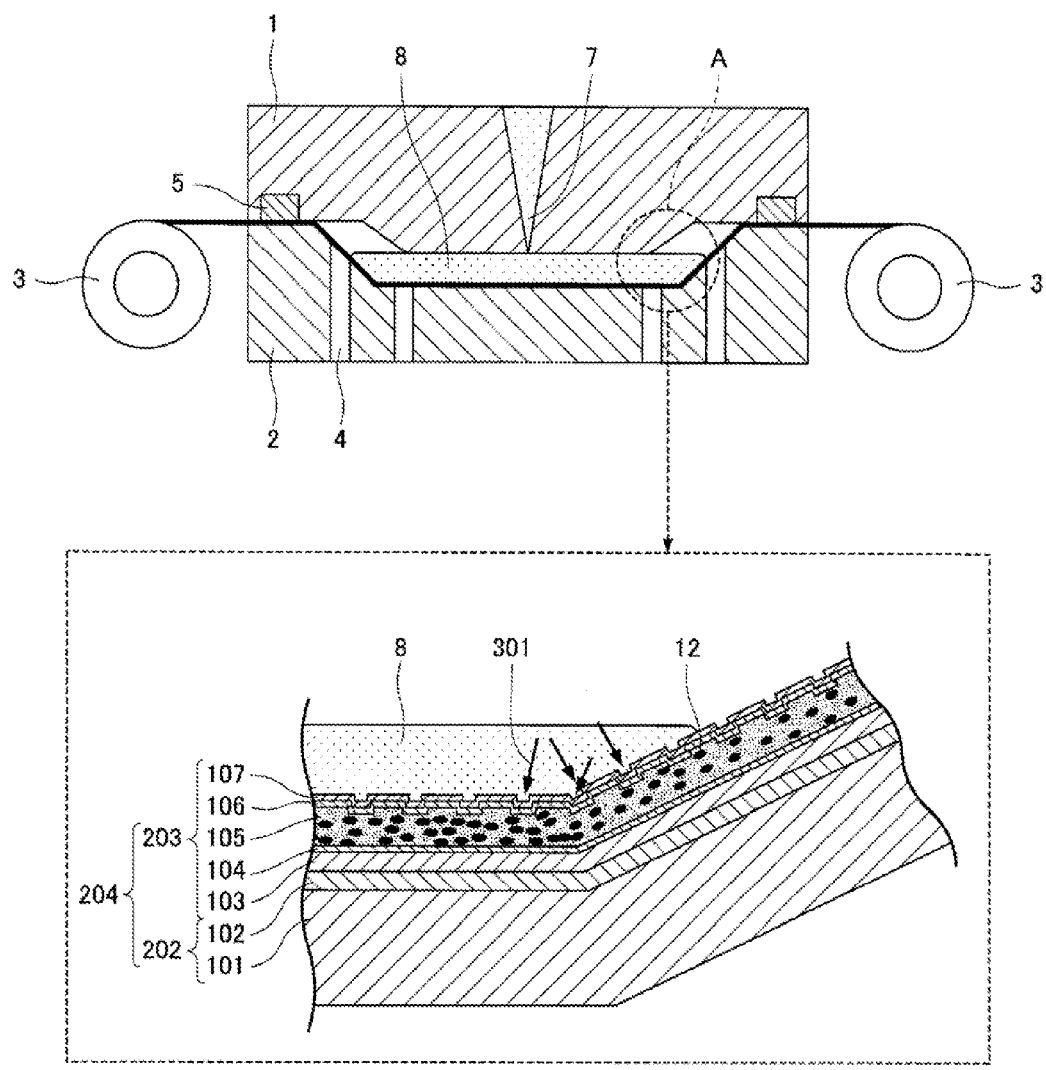
FIG. 12 is a sectional view of a part of a production step of the in-mold molded product in Embodiment 3 of the present invention, and an enlarged sectional view of a part in the sectional view.

The surface of the adhesive layer 107 has rough irregularities, thereby dispersing a stretching part of the decorative film 204. With reference to FIG. 12, this will be now described. FIG. 12 is a sectional view (upper figure) of a step of filling the cavity of the mold with the molten injection molding resin 8, and an enlarged sectional view (lower figure) of a part A in the sectional view (upper figure). The part A corresponds to the corner of the molded product. In FIG. 12, components corresponding to components shown in FIGS. 1 to 11 and 13 to 15 are denoted by the same reference numerals, and overlapping descriptions will be omitted.

In Embodiment 3, the surface of the adhesive layer 107 have irregularities, and thus as shown in the enlarged sectional view (lower figure) of the part A in FIG. 12, stress 301 applied from the injection molding resin 8 to the decorative film 204 is hardly focused on one point but is dispersed. Thus, the stress 301 applied from the injection molding resin 8 to the decorative film 204 is not focused on the part corresponding to the corner of the molded product, and thus the stretching part of the decorative film 204 is dispersed. This further prevents the generation of a crack extending through the coloring layer 105. On the other hand, when the surface of the decorative film is flat, stretching of the decorative film is focused on the part corresponding to the corner of the molded product, and thus in the part, a crack extending through the coloring layer 105 is easily generated.

Also, a film is generally stretched in a thin part. In Embodiment 3, the surface of the adhesive layer 107 has rough irregularities, and thus the decorative film 204 is easily stretched in parts corresponding to the recesses in the surface of the adhesive layer 107. Thus, in the decorative film 204 in Embodiment 3, the stretching part is dispersed into a plurality of parts. This further prevents the generation of a crack extending through the coloring layer 105.

Further, in Embodiment 3, the stretching part of the decorative film 204 is dispersed into a plurality of parts, and thus the thinnest part of the decorative film 204 after injection of the injection molding resin 8 may be thicker than that of which the stretching part is focused on one part. Thus, the decorative film 204 in Embodiment 3 is also effective for preventing seeing color of the base through the transfer film 203.

Embodiment 3 has been described on the coloring layer 105 including one layer. However, depending on design such as pictures or patterns that decorate the surface of the molded product, the coloring layer sometimes includes a plurality of layers. In that case, the inorganic filler pieces 12 may be included in all layers that constitute the coloring layer, or the inorganic filler pieces 12 may be dispersed in only a part of the layers that constitute the coloring layer as long as irregularities can be formed in the interface between the mask layer and the coloring layer, the interface between the adhesive layer and the mask layer, and the surface of the adhesive layer.

As described above, according to Embodiments 1 to 3, the inorganic filler piece 12 can prevent the growth of the microcrack 13 generated in the coloring layer 105 of the transfer film 203 during injection molding to prevent a poor appearance such that a base (surface of the molded injection molding resin 8) is visually recognized through the crack. Embodiments 1 to 3 may be combined arbitrarily.

Some exemplary embodiments of the present invention have been described in detail, but those skilled in the art would easily understand that various changes may be made in the exemplary embodiments without departing from the novel teaching of the present invention and the advantages of the present invention. Therefore, such various changes are intended to fall within the scope of the present invention.

What is claimed is:

1. An in-mold molded product comprising:
   molded resin;
   a transfer film sequentially including an adhesive layer in contact with the molded resin, and a coloring layer formed of an ink; and
   a plurality of inorganic filler pieces contained in the coloring layer,
   wherein a microcrack is generated between the inorganic filler pieces in the coloring layer.

2. The in-mold molded product according to claim 1, wherein the microcrack is generated from an interface between the inorganic filler piece and the ink forming the coloring layer.

3. An in-mold molded product comprising:
   molded resin;
   a transfer film sequentially including an adhesive layer in contact with the molded resin, and a coloring layer formed of an ink; and
   a plurality of inorganic filler pieces contained in the coloring layer,
   wherein the inorganic filler piece has a scale shape, a flat plate shape, or a rod shape.

4. The in-mold molded product according to claim 3, wherein an average particle size of the plurality of inorganic filler pieces is equal to or smaller than a thickness of a thinnest part of the coloring layer.

5. The in-mold molded product according to claim 3, wherein the ink forming the coloring layer is a curable ink.

6. The in-mold molded product according to claim 3, wherein a surface of the coloring layer on a side of the adhesive layer has irregularities, and
   a surface of the adhesive layer on a side of the molded resin has irregularities.

* * * * *